(12) United States Patent
Li et al.

(10) Patent No.: US 10,367,437 B2
(45) Date of Patent: *Jul. 30, 2019

(54) SYSTEMS, METHODS AND DEVICES FOR APPROXIMATE DYNAMIC PROGRAMMING VECTOR CONTROLLERS FOR OPERATION OF IPM MOTORS IN LINEAR AND OVER MODULATION REGIONS

(71) Applicant: The Board of Trustees of The University of Alabama, Tuscaloosa, AL (US)

(72) Inventors: Shuhui Li, Northport, AL (US); Xingang Fu, Tuscaloosa, AL (US); Hoyun Won, Tuscaloosa, AL (US); Yang Sun, Tuscaloosa, AL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,707

(22) Filed: Jan. 25, 2018

(65) Prior Publication Data

US 2018/0212541 A1 Jul. 26, 2018

Related U.S. Application Data

(60) Provisional application No. 62/450,702, filed on Jan. 26, 2017.

(51) Int. Cl.
*H02P 21/00* (2016.01)
*H02P 27/08* (2006.01)

(52) U.S. Cl.
CPC .......... *H02P 21/0014* (2013.01); *H02P 27/08* (2013.01)

(58) Field of Classification Search
None
See application file for complete search history.

(56) References Cited

U.S. PATENT DOCUMENTS 9,369,073 B1 * 6/2016 Tian ........................ H02P 6/20
2015/0039545 A1 * 2/2015 Li ........................ G05B 13/027
706/23

OTHER PUBLICATIONS

Akin, et al., "Sensorless Field Oriented Control of 3-Phase Permanent Magnet Synchronous Motors," Texas Instruments Incorporated. 2013, 43 pages. Available at http://www.ti.com/lit/an/sprabq3/sprabq3.pdf.

(Continued)

*Primary Examiner* — James G Norman
(74) *Attorney, Agent, or Firm* — Meunier Carlin & Curfman LLC

(57) ABSTRACT

Described herein is an approximate dynamic programming (ADP) vector controller for control of a permanent magnet (PM) motor. The ADP controller is developed using the full dynamic equation of a PM motor and implemented using an artificial neural network (ANN). A feedforward control strategy is integrated with the ANN-based ADP controller to enhance the stability and transient performance of the ADP controller in both linear and over modulation regions. Simulation and hardware experiments demonstrate that the proposed ANN-based ADP controller can track large reference changes with high efficiency and reliability for PM motor operation in linear and over modulation regions.

18 Claims, 13 Drawing Sheets

(56) References Cited

OTHER PUBLICATIONS

Balakrishnan and V. Biega, "Adaptive-Critic-Based Neural Networks for Aircraft Optimal Control," J. Guidance, Control, and Dynamics, vol. 19, No. 4, pp. 893-898, 1996.

Consoli, et al., "Steady-state and transient operation of IPMSMs under maximum-torque-per-ampere control," IEEE Trans. Ind. Appl., 46(1), 121-129, 2010.

Fan, L. Zhang, M. Cheng, and K. Chau, "Sensorless SVPWM-FADTC of a New Flux-Modulated Permanent Magnet Wheel Motor Based on a Wide-Speed Sliding Mode Observer," IEEE. Trans. Ind. Electron., vol. 62(5), pp. 3143-3151, May 2015.

Filka and M. Stulrajter, "3-Phase PMSM Motor Control Kit with the MPC5604P," Freescale Semiconductor, Inc., 2015, 27 pages. Available at https://www.nxp.com/docs/en/application-note/AN4561.pdf.

Flieller, et al., "A Self-Learning Solution for Torque Ripple Reduction for Nonsinusoidal Permanent Magnet Motor Drives Based on Artificial Neural Networks," IEEE Trans. Ind. Electron., vol. 61(2), pp. 655-666, Feb. 2014.

Fu, et al., "Training recurrent neural networks with the Levenberg-Marquardt algorithm for optimal control of a grid connected converter," IEEE Trans. Neural Netw. Learn. Syst., Oct. 2014.

Hagan, et al., "Training feedforward networks with the Marquardt algorithm," IEEE Trans. Neural Netw., vol. 5(6), pp. 989-993, Nov. 1994.

Han, et al., "Adaptive Critic Based Neural Networks for Control-Constrained Agile Missile Control," Proc. The American Control Conf., San Diego, USA, Jun. 2-4, pp. 2600-2604, 1999.

Jiang, et al., "Robust Adaptive Dynamic Programming and Feedback Stabilization of Nonlinear Systems," IEEE Trans. Neural Netw. Learn. Syst., vol. 25(5), pp. 882-893, May 2014.

Krishna Kumar and J. Neidhoefer, "Immunized Adaptive Critics for Level-2 Intelligent Control," Proc. The IEEE Int. Conf. on Systems, Man and Cybernetics, Orlando, USA, pp. 856-861, Oct. 12-15, 1997.

Lee, et al., "A novel overmodulation technique for space-vector PWM inverters," IEEE Trans. Power Electron., 1998, 13(6), 1144-1151.

Lee, et al., "An adaptive H∞ controller design for permanent magnet synchronous motor drives," Control Engineering Practice, vol. 13, pp. 425-439, Apr. 2004.

Lendaris, et al., "Adaptive Critic Design for Intelligent Steering and Speed Control of a 2-Axle Vehicle," Proc. The 2000 Int. Joint Conf. on Neural Netw., Como, Italy, Jul. 2000.

Li, et al., "Conventional and Novel Control Designs for Direct Driven PMSG Wind Turbines," Electric Power Syst. Research, vol. 80, pp. 328-338, Mar. 2010.

Lin, et al., "Model-Free Predictive Current Control for IPMSM Drives Based on Current Difference Detection Techniques," IEEE Trans. Ind. Electron., vol. 61(2), pp. 667-681, Feb. 2014.

Modi, et al., "Space vector-based analysis of overmodulation in triangle-comparison based PWM for voltage source inverter," Sadhana, 38(3), 331-358, 2013.

Pellegrino, et al., "Performance comparison between surface-mounted and interior PM motor drives for electric vehicle application", IEEE Trans. Ind. Electron., 2012, 59(2), 803-811.

Prokhorov, et al., "Adaptive Critic designs," IEEE Trans. Neural Netw., vol. 8(5), pp. 997-1007, Sep. 1997.

Rahman, et al., "Advances on IPM technology for hybrid electric vehicles." IEEE Vehicle Power and Propulsion Conference, 2009, 92-97.

Saini, et al., "Adaptive Critic Based Neurocontroller for Autolanding of Aircraft," Proc. The American Control Conf., Albuquerque, USA, Jun. 4-6, pp. 1081-1085,1997.

Uddin, et al., "Fuzzy Logic-Based Efficiency Optimization and High Dynamic Performance of IPMSM Drive System in Both Transient and Steady-State Conditions," IEEE Trans. Ind. Appl., vol. 50(6), pp. 4251-4259, Nov./Dec. 2014.

Venayagamoorthy, et al., "Comparison of Heuristic Dynamic Programming and Dual Heuristic Programming Adaptive Critics for Neurocontrol of a Turbogenerator," IEEE Trans. on Neural Netw., vol. 13, No. 3, pp. 764-773, 2002.

Wang, et al., "Adaptive dynamic programming: An introduction," IEEE Comput. Intell. Mag., vol. 4(2), pp. 39-47, May 2009.

Xia, et al., "A Novel Direct Torque and Flux Control Method of Matrix Converter-Fed PMSM Drives," IEEE. Trans. Power Electron., vol. 29(10), pp. 5417-5430, Oct. 2014.

Xia, et al., "Smooth Speed Control for Low-Speed High-Torque Permanent-Magnet Synchronous Motor Using Proportional-Integral-Resonant Controller," IEEE Trans. Ind. Electron., vol. 62(4), pp. 2123-2134, Apr. 2015.

Zhang, R. Song, Q. Wei, and T. Zhang, "Optimal Tracking Control for a Class of Nonlinear Discrete-Time Systems with Time Delays Based on Heuristic Dynamic Programming," IEEE Trans. on Neural Netw., vol. 22, No. 12, pp. 1851-1862, 2011.

Zhou, et al., "Relationship between space-vector modulation and three-phase carrier-based PWM: a comprehensive analysis," IEEE Trans. Ind. Electron., 2002, 49(1), 186-196.

MotorSolver, "(4) Pole IPM Type PM-AC Synchronous motor used for University Teaching Lab Dyno-Kits (Similar to Toyota Prius Traction Motor)," available at http://motorsolver.com/wp/wp-content/uploads/2015/03/9-PRIUS-4POLE-IPM-SPECS-small.pdf.

Prius Product Information 2015, 7 pages.

MotorSolve analysis of the 2010 Toyota Prius Traction Motor. Oct. 27, 2015, 64 pages.

* cited by examiner

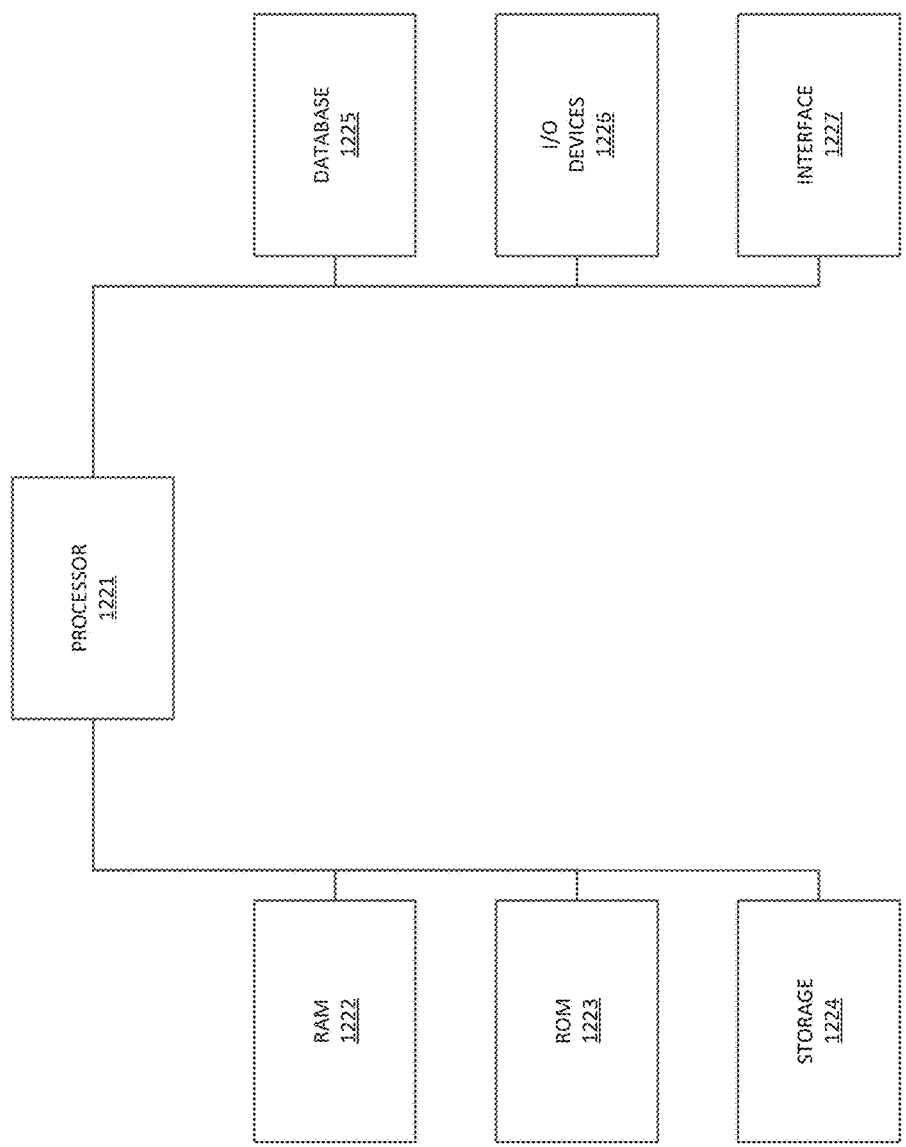

SYSTEMS, METHODS AND DEVICES FOR APPROXIMATE DYNAMIC PROGRAMMING VECTOR CONTROLLERS FOR OPERATION OF IPM MOTORS IN LINEAR AND OVER MODULATION REGIONS

CROSS REFERENCE TO RELATED APPLICATION

This application claims priority to and benefit of U.S. Provisional Patent Application Ser. No. 62/450,702 filed Jan. 26, 2017, which is fully incorporated by reference and made a part hereof.

STATEMENT REGARDING FEDERALLY FUNDED RESEARCH

This invention was made with Government support under Grant No. 1414379 awarded by the National Science Foundation. The Government has certain rights in the invention.

BACKGROUND

There are two main types of the permanent magnet (PM) synchronous motors used in electric vehicles (EVs): surface-mounted PM (SPM) motor and interior-mounted PM (IPM) motor [1]. For an SPM motor, the magnets of the motor are on the surface of the rotor. For an IPM motor, the magnets are buried inside the rotor. Due to the requirement of a large operating speed range for an electric vehicle, IPM motors are widely used in EV industry [2].

Efficiency is a very important issue for electric vehicles. In terms of IPM motors, improving efficiency requires 1) minimizing energy loss and 2) maximizing voltage utilization. From energy loss perspective, at each vehicle operating condition, a highest efficient reference command needs to be generated for control of an IPM motor. From voltage utilization standpoint, space vector pulse width modulation (SVPWM) instead of traditional sinusoidal pulse width modulation (SPWM) scheme is usually used for controlling an IPM motor through power electronic converters [3]. Further improvement of efficiency is achieved by extending SVPWM from linear modulation region to over or even six-step modulation regions [4].

Traditionally, an IPM motor is controlled by using the PI-based standard vector control method [5, 6], which consists of a torque controller and a rotor flux controller. However, recent studies have revealed that the conventional standard vector control for a PM motor has a decoupling inaccuracy issue [7], which has caused a great challenge to operate an IPM motor in over-modulation regions, in particular.

In order to overcome the challenge, the following control methods have been developed: H∞ control, fuzzy logic control [9], direct torque and flux control [10], proportional-integral-resonant control [11], sliding model control [12], predictive current control [13], and artificial neural network (ANN) control [14]. Particularly, the ANN controller in [14] replaced the speed controller to compensate the speed-tracking error. Although the ANN controller in [14] enhanced the tracking performance of the reference speed, it did not perform motor current control which is the most critical for control and operation of an IPM motor. Therefore, advanced control techniques based on approximate dynamic programming (ADP) and ANNs are desired that overcome challenges in the art.

ADP, employing the principle of optimality [15], is a very useful tool for solving optimal control problems of nonlinear systems [15, 16]. An effective approach, developed in recent years, is to use and train ANNs to realize the ADP-based control [17, 18]. ADP control based upon ANNs has been used for many nonlinear control applications, such as steering and controlling the speed of a two-axle vehicle [19], performing auto landing and control of an aircraft [21-23], controlling a turbogenerator [24], and tracking control with time delays [25]. However, as described herein, ANN-based ADP is used in IPM motor control, especially for controlling IPM motors from linear to over modulation regions.

Therefore, what is desired are improved control systems for controlling interior-mounted permanent magnet motors using an ANN-based ADP for an IPM.

SUMMARY

Methods, systems and devices are described wherein an approximate dynamic programming (ADP) vector controller is developed to overcome challenges in the art, some of which are described above. Embodiments of the disclosed ADP controller are developed using the full dynamic equation of a PM motor and implemented using an artificial neural network (ANN). A feedforward control strategy is integrated with the ANN-based ADP controller to enhance the stability and transient performance of the ADP controller in both linear and over modulation regions. Simulation and hardware experiments demonstrate that the proposed ANN-based ADP controller can track large reference changes with high efficiency and reliability for PM motor operation in linear and over modulation regions.

Embodiments of an ANN-based ADP vector-control method for optimal control of an IPM motor in linear and over modulation regions are disclosed herein and the embodiments are compared with conventional standard vector-control methods. Disclosed herein are approaches to implementing optimal vector control based on ADP for IPM motor operation in linear and over modulation regions; mechanisms to train the ANN within the ADP control system; an investigation and comparison of embodiments of the ANN-based ADP vector controller with conventional vector controllers; and a hardware experiment validation and comparison.

Further disclosed herein is a method of controlling an interior-mounted permanent magnet machine (IPM) by combining an artificial neural network (ANN) vector controller based on approximate dynamic programming (ADP) with a feedforward controller, especially for controlling IPM machines from linear to over modulation and six-step modulation regions.

Also disclosed herein is a method that allows the control action generated by the combined ADP-based ANN controller and the feedforward controller to be larger than 1, which is the six-step modulation index, for controlling IPM machines in over modulation and six-step modulation regions.

In one aspect, a method is disclosed whereby the final modulation index applied to drive the IPM inverter is always processed or cut by removing the portions of the modulation indexes generated by the controller that are larger than 1. However, even with the cutting process, the transient information in terms of control action amplitude and angle is captured for controlling the IPM machines in over modulation and six-step modulation regions.

A method is disclosed herein that allows the control action generated by the combined ADP-based ANN controller and the feedforward controller to change rapidly from smaller than 1 to larger than 1 in order to provide control capability when an IPM machine is operating in over modulation and six-step modulation regions.

A method is also disclosed herein of blocking reference dq current and error signals to affect ANN controller when an IPM machine is completely in six-step modulation region.

Further disclosed herein is a method to release the blocking of reference dq current and error signals when the operation of an IPM machine returns from six-step modulation region to over or linear modulation regions to allow the combined ADP-based ANN controller and the feedforward controller to recover its full control capability.

Other systems, methods, features and/or advantages will be or may become apparent to one with skill in the art upon examination of the following drawings and detailed description. It is intended that all such additional systems, methods, features and/or advantages be included within this description and be protected by any accompanying claims in this application or any application that claims priority to this application.

BRIEF DESCRIPTION OF THE DRAWINGS

The components in the drawings are not necessarily to scale relative to each other. Like reference numerals designate corresponding parts throughout the several views.

(FIG. 6A) d-axis current, (FIG. 6B) q-axis current;

(FIG. 7A) Rotor speed, (FIG. 7B) d-axis current, (FIG. 7C) q-axis current;

(FIG. 8A) d-axis current, (FIG. 8B) q-axis current;

(FIG. 9A) d-/q-axis current for 40% reduction of rotor flux, (FIG. 9B) d-/q-axis current for 40% increase of rotor flux;

FIG. 10A is a circuit schematic and FIG. 10B is a photograph of the experiment setup;

(FIG. 11A) d-axis current, (FIG. 11B) q-axis current, (FIG. 11C) modulation index generated by controllers; and FIG. 12 illustrates an exemplary computer that can be used for controlling a permanent magnet motor.

DETAILED DESCRIPTION

Figure 1:
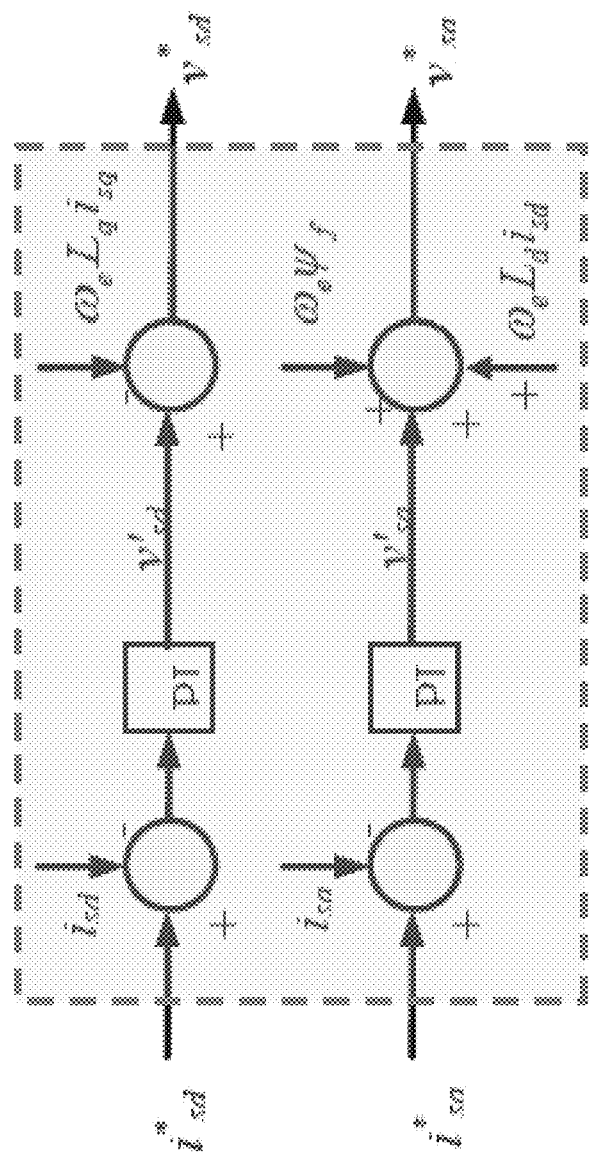
FIG. 1 shows a simple schematic of a conventional current-loop controller.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

IPM Motor Model and Control

A. IPM Motor Model

Using the motor sign convention, the Park's transformation or the space vector theory yields the model of an IPM motor in the form [26]:

$$\begin{pmatrix} v_{sd} \\ v_{sq} \end{pmatrix} = R_s \begin{pmatrix} i_{sd} \\ i_{sq} \end{pmatrix} + \frac{d}{dt} \begin{pmatrix} \psi_{sd} \\ \psi_{sq} \end{pmatrix} + \omega_e \begin{pmatrix} 0 & -1 \\ 1 & 0 \end{pmatrix} \begin{pmatrix} \psi_{sd} \\ \psi_{sq} \end{pmatrix} \quad (1)$$

where $R_s$ is the resistance of the stator winding; $\omega_e$ is the motor electrical rotational speed; and $v_{sd}$, $v_{sq}$, $i_{sd}$, $i_{sq}$, $\psi_{sd}$, and $\psi_{sq}$ are the d- and q-axis components of instant stator voltage, current, and flux. If the d-axis is aligned along the rotor flux position, the stator flux linkages are $$\begin{pmatrix} \psi_{sd} \\ \psi_{sq} \end{pmatrix} = \begin{pmatrix} L_{ls} + L_{dm} & 0 \\ 0 & L_{ls} + L_{qm} \end{pmatrix} \begin{pmatrix} i_{sd} \\ i_{sq} \end{pmatrix} + \begin{pmatrix} \psi_f \\ 0 \end{pmatrix} \quad (2)$$

where $L_{ls}$ is the leakage inductance of the stator winding; $L_{dm}$ and $L_{qm}$ are the stator and rotor d- and q-axis mutual inductances; $\psi_f$ is the flux linkage produced by the permanent magnet. The torque of the IPM motor is calculated by $$\tau_{em} = p(\psi_f i_{sq} + (L_d - L_q) i_{sd} i_{sq}) \quad (3)$$

where p is pole pairs, $L_d = L_{ls} + L_{dm}$, and $L_q = L_{ls} + L_{qm}$. If the torque computed from (3) is positive, the motor operates in the drive mode; otherwise, it operates in the regenerate mode.

B. IPM Motor Field-Oriented Vector Control

An advantage of field-oriented vector control for a PM motor is separating the magnetic field and torque control by aligning the d axis with rotor field flux linkage. This independent control allows controlling an AC machine as a separately excited DC motor. A typical field-oriented vector controller for an IPM motor has two decoupled d- and q-axis current controllers to fulfill the decoupled magnetic field and torque control, respectively. In practical applications such as electric vehicles, a reference torque is first generated according to the driving requirement of the vehicle under different road conditions. Then, the torque reference is converted into d- and q-axis current references (FIG. 1) as described herein. An objective of the current controllers shown in FIG. 1 is to direct the actual d- and q-axis currents of the motor to follow the current references.

C. Conventional Current Vector Control

The current control strategy of the conventional approach is developed by rewriting (1) as:

$$v_{sd} = \underbrace{\left(R_s i_{sd} + L_d \frac{di_{sd}}{dt}\right)}_{v'_{sd}} - \underbrace{\omega_e L_q i_{sq}}_{Comp.\ Term} \quad (4a)$$

$$v_{sq} = \underbrace{\left(R_s i_{sq} + L_q \frac{di_{sq}}{dt}\right)}_{v'_{sq}} - \underbrace{\omega_e L_d i_{sd} + \omega_e \psi_f}_{Comp.\ Term} \quad (4b)$$

where the items in the large parentheses are used as the dynamic equations and the other items, treated as the compensation terms, are not included in obtaining the system transfer function [7, 26]. Hence, the corresponding transfer functions, $1/(R_s + s \cdot L_d)$ and $1/(R_s + s \cdot L_q)$, are normally used to tune the conventional current proportional-integral (PI) controllers. After the d- and q-axis current controllers are tuned, the compensation terms are added back to the output of the PI controllers. This approximation would cause a decoupling inaccuracy.

FIG. 1 shows the conventional IPM current control structure, in which the final d- or q-axis control voltage, $v^*_{sd}$ or $v^*_{sq}$, comprises the d- or q-axis voltage, $v'_{sd}$ or $v'_{sq}$, generated by the current controller plus compensation terms as:

$$v^*_{sd} = v'_{sd} - \omega_e L_q i_{sq} \quad (5a)$$

$$v^*_{sq} = v'_{sq} + \omega_e L_d i_{sd} + \omega_e \psi_f \quad (5b)$$

Control of IPM Motor in Linear to Over Modulation Regions

A. Maximum Torque Per Ampere Control

A characteristic of an IPM motor is that its q-axis inductance is obviously larger than the d-axis inductance. Thus, the generated torque in an IPM motor consists of the field torque from the permanent magnet and an additional torque that is generated due to the difference between the q- and d-axis inductances. According to eq. (3), the former is proportional to the q-axis current, and the latter is proportional to the product of the d-axis current and q-axis current. As a result, for a given torque command, $\tau^*_{em}$, there are multiple current vectors that can generate the specified torque. The current vector, which has a minimum magnitude, is called the maximum torque per ampere (MTPA) current and represents the operating condition of the maximum efficiency for the commanded torque [27]. Determination of an MTPA current needs to consider two additional constraints: the rated current limit $I_{dq\_max}$ of an IPM machine (eq. (6)) and PWM saturation limit (eq. (7)) where $V_{dq\_max}$ represents the maximum voltage that can be generated by the inverter.

$$\sqrt{i_{sd}^2 + i_{sq}^2} \leq I_{dq\_max} \quad (6)$$

$$\sqrt{v_{sd}^2 + v_{sq}^2} = \sqrt{(\omega_e L_q i_{sq})^2 + (\omega_e L_d i_{sd} + \omega_e \psi_f)^2} \leq V_{dq\_max} \quad (7)$$

This would result in an optimization formulation as shown by $$\text{Minimize:} \sqrt{i_{sd}^2 + i_{sq}^2} \leq I_{dq\_max}$$

$$\text{Subject to:} \tau_{em}^* = p(\psi_f i_{sq} + (L_d - L_q) i_{sd} i_{sq}),$$
$$\sqrt{i_{sd}^2 + i_{sq}^2} \leq I_{dq\_max}, \sqrt{v_{sd}^2 + v_{sq}^2} \leq V_{dq\_max}$$

By solving the optimization problem, an MTPA current vector can be obtained and is then used by the IPM current controllers whose objective are to track the MTPA d- and q-axis currents as explained herein. For maximum possible MTPA current range considering the voltage constraint, though, the inverter maximum voltage limit $V_{dq\_max}$ should be as large as possible, which requires extending the inverter operation from normal linear modulation region to overmodulation region. This is especially important for operating an IPM motor at a high speed. On the other hand, the optimization problem requires accurate motor parameters to determine the reference d- and q-axis currents, which is usually not true in real-life conditions. Consequently, if a generated MTPA current vector makes the left side of eq. (7) larger than $V_{dq\_max}$, the inverter should operate in the six-step modulation mode as explained below.

B. Control in Linear and Over Modulation Regions

Full utilization of the DC bus voltage is necessary for achieving maximum output torque of an IPM motor under all operating conditions of an electric vehicle. Over modulation aims to extend the linear modulation region of the SVPWM, which leads to a better utilization of the DC bus voltage and enhances the MTPA range of an IPM motor.

Figure 2:
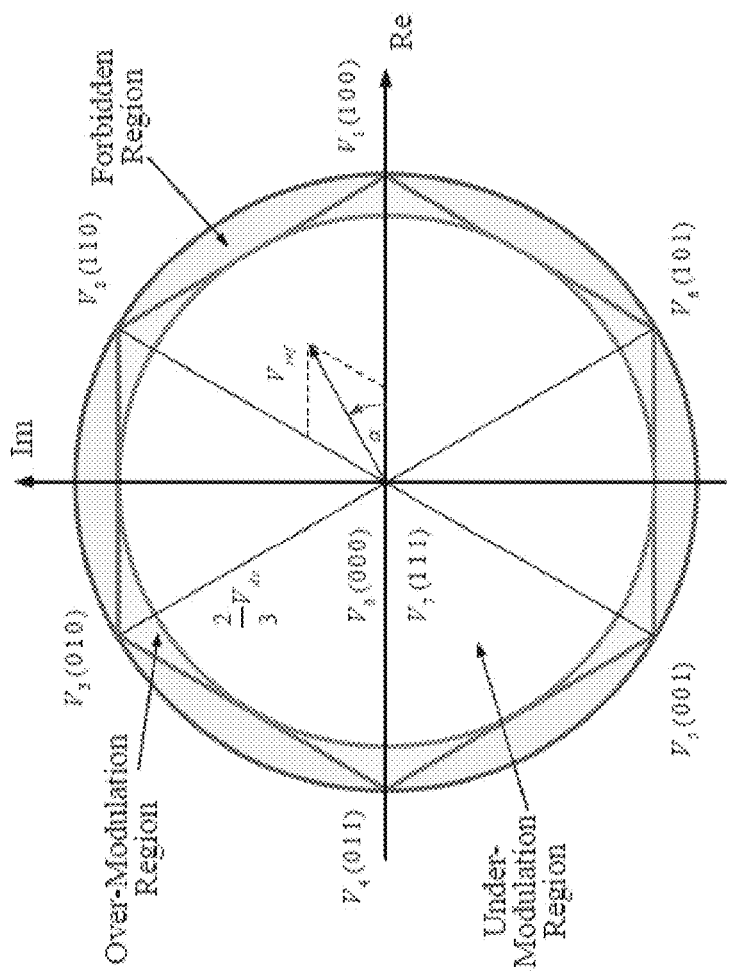
FIG. 2 shows two over-modulation regions in space vector representation.

For a general SPWM, the highest possible fundamental peak phase voltage is 0.5 Vdc. With the SVPWM, the fundamental peak phase voltage can be as high as $V_{dc}/\sqrt{3}$ in linear modulation mode when the reference control voltage vector makes the inner circular trajectory as shown by FIG. 2. In general, the operation of an IPM in linear and over modulation regions is measured by the modulation index as defined below $$MI = V^*/(2V_{dc}/\pi) \quad (8)$$

where V* is the reference peak phase voltage and $$\frac{2V_{dc}}{\pi}$$

is the fundamental peak phase voltage under the six-step modulation mode. Thus, the highest modulation index of SVPWM linear modulation mode is $$MI = \frac{\pi}{2\sqrt{3}} = 0.907.$$

The fundamental peak phase voltage can be higher when the desired control voltage trajectory partly passes outside of the hexagon and goes into the nonlinear or overmodulation region.

The overmodulation region has MI ranging from 0.907 up to 1 [4, 28], which is normally divided into two modes of operation depending on MI values. In mode 1, corresponding to MI ranging from 0.907 up to 0.952, the actual voltage vector keeps the angular speed of a modified reference vector constant, but its amplitude changes over time. In mode 2, corresponding to MI ranging from 0.952 up to 1, both the amplitude and angle of the modified reference vector vary. When MI is 1, the inverter actually operates in the six-step modulation mode [4, 28].

A challenge of the conventional control method is the stability and reliability for control of an IPM motor from linear to over modulation regions, in over and six-step modulation regions, and from the over modulation region back to the linear modulation region. In the sections that follow, an ADP vector control technique is described that overcomes the challenge.

ADP Vector Control of IPM Motor

A. General ADP-Based Control Formulation

ADP is a very useful tool for solving optimization and optimal control problems [16]. Assume a discrete dynamic system is represented by:

$$\vec{x}(k+1) = f(\vec{x}(k), \vec{u}(k)), k=0,1, \quad (9)$$

where $\vec{x}(k)$ represents the state vector of the system and $\vec{u}(k)$ denotes the control action and $f( )$ is the system function.

ADP-based control is generally developed based upon a performance index or cost function as shown by [16, 17]:

$$J(\vec{x}(j), j) = \sum_{k=j}^{K} \gamma^{k-j} \cdot U(\vec{x}(k), \vec{u}(k), k) \quad (10)$$

where γ is the discount factor with $0 \leq \gamma \leq 1$, K is the trajectory length used in the ADP, and U(•) is the utility function. The function J(•), dependent on the initial time j and the initial state $\vec{x}(j)$, is referred to as the cost-to-go of state $\vec{x}(j)$ in the ADP problem. The objective of an ADP control problem is to decide a control sequence $\vec{u}(k)$, k=1, j+1, ... so that the function J(•) (i.e., the cost) is minimized. According to Bellman, the optimal cost from time k is equation:

$$J^*(\vec{x}(k)) = \min_{\vec{u}(k)} [U(\vec{x}(k), \vec{u}(k)) + \gamma J^*(\vec{x}(k+1))] \quad (11)$$

The optimal control action $\vec{u}^*(k)$ at time k is the $\vec{u}(k)$ which achieves this minimum, i.e., $$\vec{u}^*(k) = \arg\min_{\vec{u}(k)}[U(\vec{x}(k),\vec{u}(k)) + \gamma J^*(\vec{x}(k+1))] \quad (12)$$

B. ADP Formulation for Vector Control of IPM Motor

In terms of the vector control, the dynamic system model of an IPM motor is developed based on the complete motor state space model which is obtained by rearranging (4) into the standard state-space form as shown by $$\frac{d}{dt}\begin{pmatrix} i_{sd} \\ i_{sq} \end{pmatrix} = -\begin{pmatrix} \frac{R_s}{L_d} & -\frac{\omega_e L_q}{L_d} \\ \omega_e \frac{L_d}{L_q} & \frac{R_s}{L_q} \end{pmatrix}\begin{pmatrix} i_{sd} \\ i_{sq} \end{pmatrix} + \begin{pmatrix} \frac{v_{sd}}{L_d} \\ \frac{v_{sq}}{L_q} - \frac{\omega_e \psi_f}{L_q} \end{pmatrix} \quad (13)$$

where the system states are $i_{sd}$ and $i_{sq}$. The rotor magnet flux $\psi_f$ is assumed constant, and converter output voltages $v_{sd}$ and $v_{sq}$ are proportional to the control voltage of the controller [29].

For the discrete-control implementation of the ADP controller, the discrete equivalent of the continuous state-space model must be obtained by utilizing a zero-order or first-order hold discrete equivalent mechanism. The transformation yields $$\begin{pmatrix} i_{sd}(kT_s + T_s) \\ i_{sq}(kT_s + T_s) \end{pmatrix} = A\begin{pmatrix} i_{sd}(kT_s) \\ i_{sq}(kT_s) \end{pmatrix} + B\begin{pmatrix} v_{sd}(lT_s) - 0 \\ v_{sq}(kT_s) - \omega_e \psi_f \end{pmatrix} \quad (14)$$

in which $T_s$ is the sampling period, A is the system matrix, and B is the input matrix. Since $T_s$ is present on both sides, (14) can be simplified as $$\vec{i}_{sdq}(k+1) = A \cdot \vec{i}_{sdq}(k) + B \cdot (\vec{v}_{sdq}(k) - \vec{v}_{rdq}) \quad (15)$$

where k is an integer time step, $\vec{i}_{sdq}=(i_{sd},i_{sq})'$; $\vec{v}_{sdq}=(v_{sd},v_{sq})'$ are the control actions, and $\vec{v}_{rdq}=(0, \omega_e\psi_f)'$ represents the induced voltage of the rotor permanent magnet. Therefore, in comparison with (9), $\vec{i}_{sdq}(k)$ is equivalent to $\vec{x}(k)$ and $\vec{v}_{sdq}(k)$ is equivalent to $\vec{u}(k)$.

Regarding the ADP cost function for IPM motor control, we define utility function as:

$$U(\vec{i}_{sdq}(k),\vec{v}_{sdq}(k)) = \sqrt{(i_{sd}(k)-i^*_{sd})^2+(i_{sq}(k)-i^*_{sq})^2} \quad (16)$$

where $i_{sd}^*$ and is $i_{sq}^*$ are the reference d- and q-axis motor currents, respectively. Note: although $\vec{v}_{sdq}(k)$ does not exist on the right side of (16), it affects the utility function through (15). We choose $\gamma=1$ in (10). Therefore, applying (16) in (10), we have the ADP cost function as described herein as:

$$J(\vec{i}_{sdq}) = \sum_{k=j}^{N}([i_{sd}(k)-i^*_{sd}]^2 + [i_{sq}(k)-i^*_{sq}]^2) \quad (17)$$

The objective of the ADP problem for IPM vector control is to choose a vector control sequence, $\vec{v}_{sdq}(k)$, k=j, j+1, . . . so that the function J(•) in Eq. (17) is minimized. This objective is equivalent to make the actual d-q current track the d-q reference current trajectory as closely as possible.

Implement ADP Vector Control Using ANN

A. ANN-Based ADP Control for IPM Motor

Figure 3:
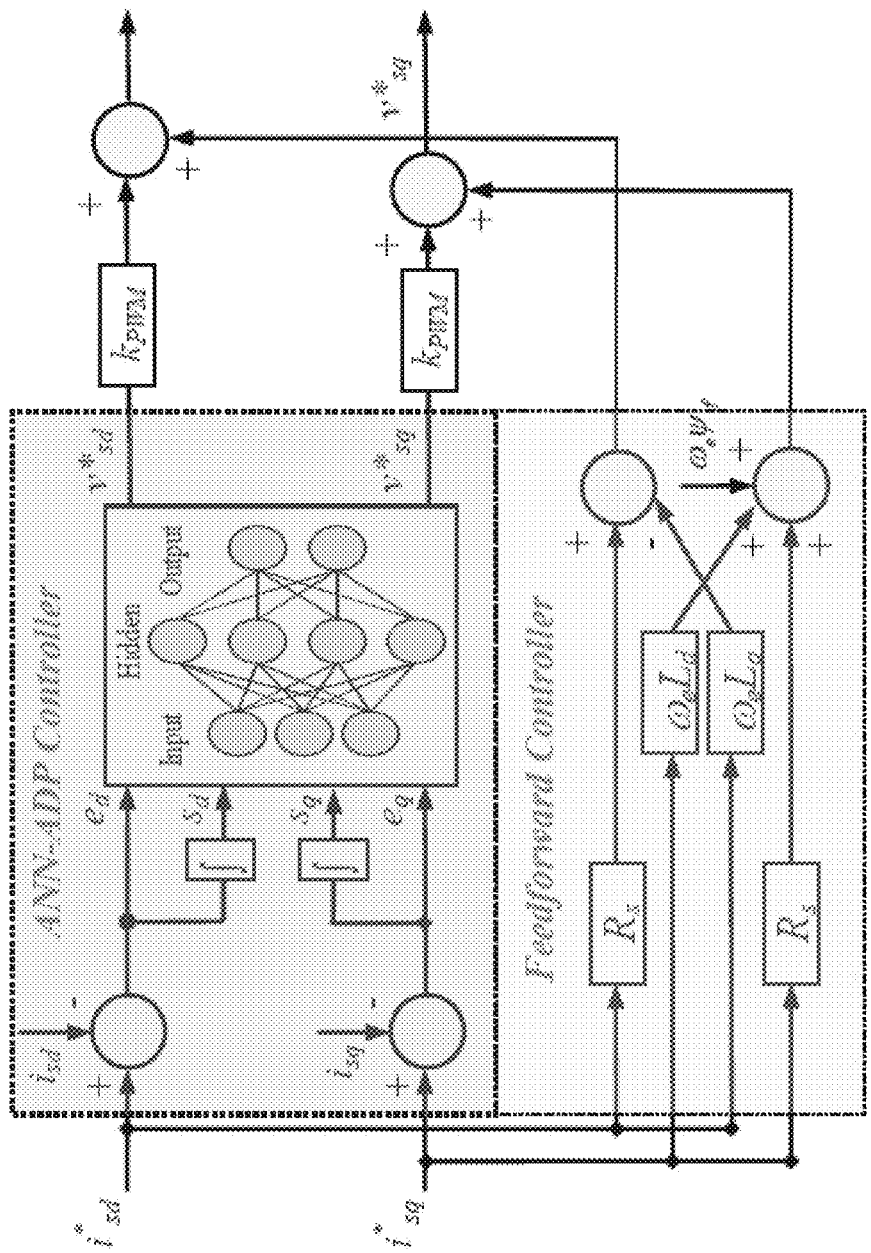
FIG. 3 illustrates an embodiment of an ANN-based ADP current-loop controller.

Described is an embodiment of an ADP vector controller using an ANN (FIG. 3). The ANN, also called the action network, is a multilayer neural network comprising four different layers: an input layer, two hidden layers, and an output layer. The input layer contains four inputs. Two of these inputs comprise the vector $\vec{e}_{dq}(k)$, the error term, and the other two comprise $\vec{s}_{dq}(k)$, the integral of the error term. These two terms are defined by $$\vec{e}_{dq}(k)=\vec{i}_{sdq}(k)-\vec{i}_{sdq}^*(k), \vec{s}_{dq}(k)=\int_0^k \vec{e}_{dq}(k)dt \quad (18)$$

The output layer gives $\vec{v}^*_{sdq}(k)$. This output is multiplied by a gain, $k_{PWM}$, caused by the SVPWM of the IPM converter [29]. In order to enhance controller dynamic performance and overcome the challenges for current tracking in over and six-step modulation modes, a feedforward element is added to the output of the ANN (FIG. 3), which represents the steady-state control voltage needed to track the reference d- and q-axis currents if the motor parameters can be correctly estimated. The ANN coordinates with the feedforward controller to fulfill the control of the IPM motor from linear to over modulation regions and vice versa. Consequently, the final control action applied to the IPM motor, $\vec{v}_{sdq}(k)$, is given by $$\vec{v}_{sdq}(k)=k_{PWM} \cdot A(\vec{e}_{dq}(k),\vec{s}_{dq}(k),\vec{w})+F(i^*_{sd},i^*_{sq}) \quad (19)$$

where $\vec{w}$ is the neural network's overall weight vector, and $\mathrm{IA}(\vec{e}_{dq}(k),\vec{s}_{dq}(k),\vec{w})$ denotes the whole action network, $F(i_{sd}^*,i_{sq}^*)$ denotes the feedforward controller.

B. Training ANN to Implement ADP

To achieve ADP-based optimal control for an IPM motor, the ANN must be trained based ADP, i.e., minimize the performance index or cost represented by (17). Training the ANN means tuning the neural-weights until the ANN learned to control the IPM motor adequately, based on ADP.

The weights of the ANN are tuned by using the Levenberg-Marquardt (LM) optimization method [30]. The ultimate goal of the training process is minimizing the ADP cost (17) by repeatedly adjusting the network weights until a stop criterion is reached.

The LM algorithm is a variant of gradient descent which has proven to be one of the most powerful training algorithms for neural networks [30]. Since the control problem described herein is actually a recurrent neural network training problem, it is necessary to modify the LM algorithm slightly using the method detailed by [26] and summarized below.

First, the gradient of (17) is computed with respect to the weight vector $\partial J/\partial \vec{w}$. Assume k=1 represents the initial state. Then, in matrix form this is:

$$\frac{\partial J}{\partial \vec{w}} = \frac{\partial \sum_{k=1}^{N}(U(k))^2}{\partial \vec{w}} = \sum_{k=1}^{N} 2U(k)\frac{\partial U(k)}{\partial \vec{w}} = 2J_p(\vec{w})^T U \quad (20)$$

where $V(k)=[i_{sd}(k)-i^*_{sd}]^2+[i_{sq}(k)-i^*_{sq}]^2$, U is a vector containing U(1) to U(N), and $J_p(\vec{w})$ is a Jacobian matrix defined for a recurrent neural network by:

$$J_p(\vec{w}) = \begin{bmatrix} \frac{\partial U(1)}{\partial w_1} & \cdots & \frac{\partial U(q)}{\partial w_M} \\ \vdots & \ddots & \vdots \\ \frac{\partial U(N)}{\partial w_1} & \cdots & \frac{\partial U(N)}{\partial w_M} \end{bmatrix}, U = \begin{bmatrix} U(1) \\ \vdots \\ U(N) \end{bmatrix} \quad (21)$$

Then, using these definitions, the LM weight update is applied as:

$$\Delta\vec{w} = -[J_p(\vec{w})^T J_p(\vec{w}) + \mu I]^{-1} J_p(\vec{w})^T V \quad (22a)$$

$$\vec{w}_{update} = \vec{w} + \Delta\vec{w} \quad (22b)$$

As (20)-(23) show, the Jacobian matrix $J_p(\vec{w})$, is the kernel for training used by the LM method. This is achieved through a forward accumulation through a time (FATT) algorithm to efficiently calculate the Gauss-Newton Jacobian matrix and the gradient-descent vector, both of which are required for the LM to be applied as shown by (21) and (22). A more detailed description of the LM+FATT training algorithm can be found in [31].

Tuning/Training IPM Current Controllers

The IPM control has been considered for two IPM motor cases: one for simulation and one for a hardware experiment. The simulation case uses parameters of an IPM motor that are typical for an electric vehicle application [32, 33]. The hardware experiment is based on a laboratory IPM motor [34], which has a smaller power rating and is mainly used for the purpose of experimental validation. Table I shows the IPM motor parameters used in each case.

TABLE I

IPM DATA USED IN SIMULATION/EXPERIMENTAL STUDY

| Parameter | Simulation | Hardware | Units |
|---|---|---|---|
| Rated Power | 50 | 0.24 | kW |
| dc voltage | 500 | 42 | V |
| Nominal Torque | 250 | 0.84 | Nm |
| Maximum Speed | 6000 | 3800 | RPM |
| Permanent magnet flux | 0.1757 | 0.01544 | Wb |
| Inductance in q-axis, Lq | 2.057 | 1.07 | mH |
| Inductance in d-axis, Ld | 1.598 | 1.36 | mH |
| Stator copper resistance, Rs | 0.0065 | 0.1354 | Ω |
| Inertia | 0.089 | 0.00004 | Kg · m² |
| Friction coefficient | 0.1 | 0.001 | N · m · s/rad |
| Pole pairs | 4 | 2 | |

A. Tuning Conventional Current Controller

Figure 4:
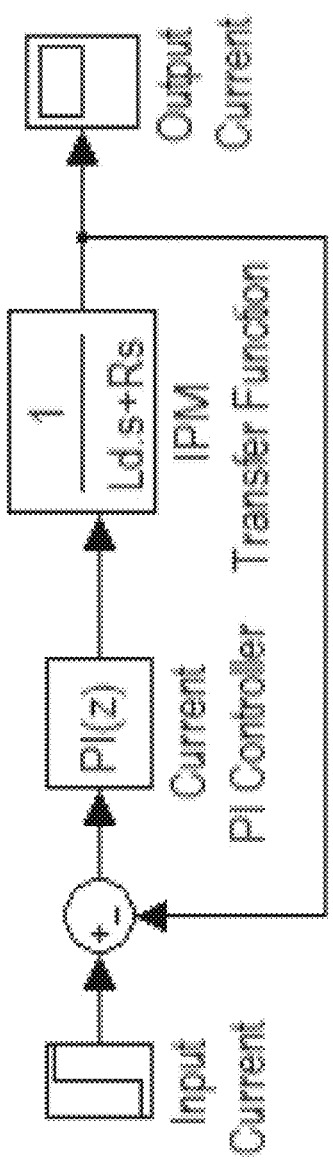
FIG. 4 shows a closed-loop SimuLink model for designing an IPM current controller.

The PI parameters of the conventional current controller were tuned using the PID tuner function within the PID controller block in MATLAB. FIG. 4 shows the closed-loop Simulink model used to tune the PI parameters. The transfer function in the figure is $1/(R_S+s \cdot L_d)$ or $1/(R_S+s \cdot L_q)$ (see above). The crossover frequency was 2,000 rad/s while the phase margin was 60 degrees. The controller was initially tuned under the condition of constant dc voltage and constant motor parameters as shown in Table I.

B. Training ANNs

Figure 5:
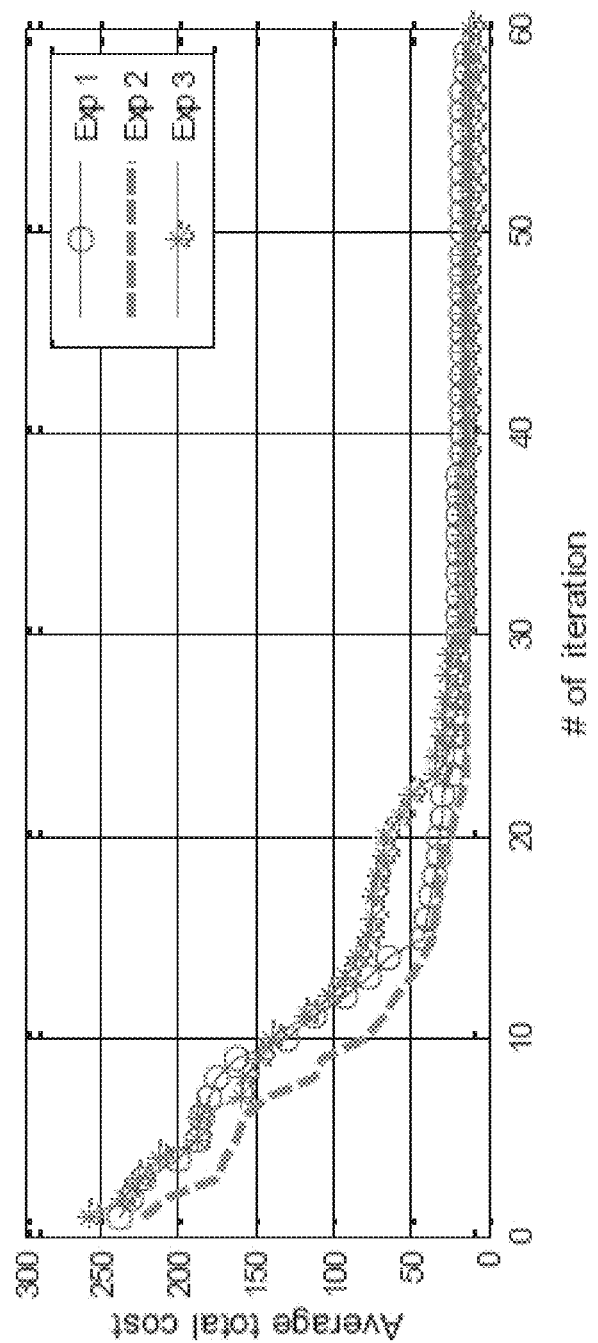
FIG. 5 is a graph illustrating average ADP cost per trajectory time step for training ANN.

The ANN of an ADP controller must be trained before applying it to control an IPM motor. For each of the simulation and experiment cases, an ANN was trained to implement ADP based on the motor parameters shown in Table I. The ANN was trained repeatedly to track a variety of reference d-q current trajectories until satisfactory and excellent tracking performance is achieved. The procedure of each training experiment is as follows [31]: 1) randomly generate changing sample reference dq current trajectories; 2) randomly generate a sample initial state $i_{sdq}(1)$; 3) unroll the IPM current trajectory from the initial state; 4) train the ANN as detailed above; and 5) repeat the process for all of the reference dq current trajectories and sample initial states until reaching a stop criterion. Each initial state $i_{sdq}(1)$ was generated randomly within acceptable d- and q-axis current ranges. Each trajectory duration was unrolled for a duration of 1 second, with a sampling time of Ts=0.1 ms, and the reference dq current, also within acceptable d- and q-axis current ranges, was changed randomly every 0.1 seconds. All of the network weights were initially randomized using a uniform distribution within ±0.1, and 10 randomized reference current trajectories were created during each training epoch. Since each training experiment starts with randomly generated network weights, each experiment may converge to different ADP cost. FIG. 5 shows the average total ADP cost of three successful ANN training experiments. The final network weights are selected from those training experiments having the lowest ADP costs. After the network is well trained, the ANN-based ADP controller for simulation or experiment case is able to track reference d-q current with minimum errors and in an optimal way according to ADP.

Note: the ANN is trained offline, and no training occurs in the real-time control stage. Besides, although it is impossible for the training current trajectories to cover all current transient conditions, such as startup and motor transient events, the trained ANN-ADP controller has a strong ability to track broad reference current trajectories that are not presented in the training data set. In both simulation and hardware experiments shown herein, we have tested various startup and transient cases and the ANN-based ADP controller has demonstrated great performance and robustness in both linear and over modulation regions as well as the transition between the two regions.

C. Other Special Techniques to Enhance Controllability and Stability of IPM Motor Control in Over and Six-Step Modulation Regions The following mechanisms have also been developed to enhance IPM motor controllability and stability in over and six-step modulation regions and in transition between six-step and over/linear modulation regions.

1) A method that allows the control action generated by the combined ADP-based ANN controller and the feedforward controller to be larger than 1, which is the six-step modulation index, for controlling IPM machines in over modulation and six-step modulation regions.

2) A method that the final modulation index of the reference voltage passed to the PWM block, which is used to generate driving pulses for controlling the IPM inverter, is always processed by forcing the portions of the modulation indexes generated by the controller that are larger than 1 equal to 1. However, even with the process, the transient information in terms of voltage amplitude and angle of the control action generated by the controller is captured for controlling the IPM machines in over modulation and six-step modulation regions.

3) A method that allows the control action generated by the combined ADP-based ANN controller and the feedforward controller to change rapidly, in transient conditions, from smaller than 1 to larger than 1 in order to provide control capability when an IPM machine is operating in over modulation and six-step modulation regions.

4) A method of gradually blocking or completely blocking reference dq current and current error signals to affect ANN controller when an IPM machine is entering or is completely in six-step modulation region.

5) A method to release the blocking or gradually release the blocking of reference dq current and current error signals when the operation of an IPM machine is out of the six-step modulation mode or returns from six-step modulation region to over or linear modulation regions to allow the combined ADP-based ANN controller and the feedforward controller to recover its full control capability.

Simulation Evaluation of Conventional and ANN-ADP Controllers

The simulation model of the IPM motor was developed by using MATLAB SimPowerSystems. For a fair comparison, the feedforward control is applied to both conventional and ANN-ADP vector controllers. The sampling rate is 0.1 ms.

A. Current Tracking Under Constant Speed

Figure 6B:
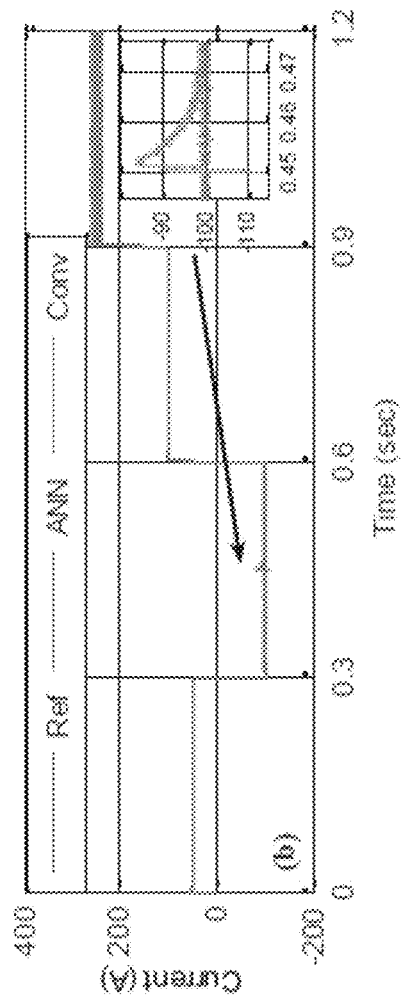
FIGS. 6A and 6B illustrate current tracking at constant speed—conventional vs. ANN-ADP.
Figure 6A:
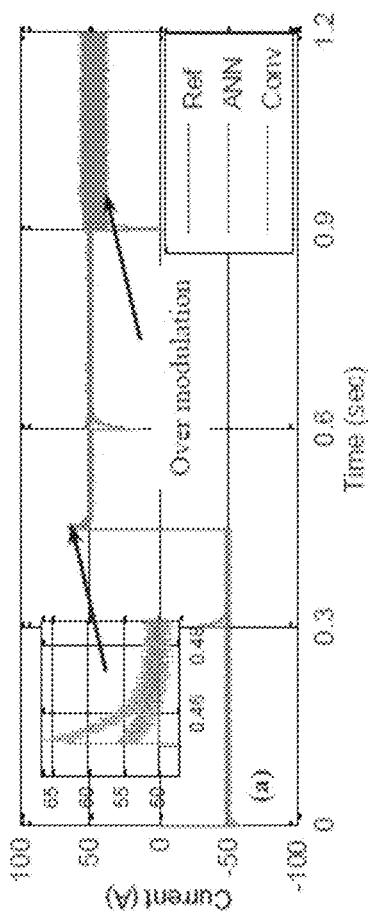

In the EV industry, the current-loop controller of an IPM motor is normally evaluated on a dynamometer system before applying it to a real-life vehicle, in which the dynamometer is controlled at a constant speed and the evaluation focuses on current tracking behavior of the controller. FIG. 6 compares the current tracking control of the IPM motor using ANN-ADP and conventional vector-control methods under constant motor speed through simulation in MATLAB. In the figure, the d-axis current reference of the motor is initially −50 A and changes to 50 A at 0.45 sec. The q-axis current reference is initially 50 A and then changes to −100 A, 100 A, and 250 A at 0.3 sec, 0.6 sec, and 0.9 sec, respectively. Before 0.9 sec, the IPM motor operates in linear modulation mode while after 0.9 sec the motor operates in nonlinear modulation mode (FIG. 6c). As shown in FIG. 6, both conventional and ANN-ADP controllers can track the reference current before 0.9 sec. However, for each reference current change, the conventional controller shows more overshoot and oscillations while the ANN-ADP controller can track the current reference almost in zero response time and with no overshoot. When operating in over modulation regions, both conventional and ANN-ADP controllers try to track the reference currents as much as possible but fewer oscillations are presented in the d- and q-axis currents that are controlled by using the ANN-ADP controller.

B. Current Tracking Under Variable Speed

Figure 7A:
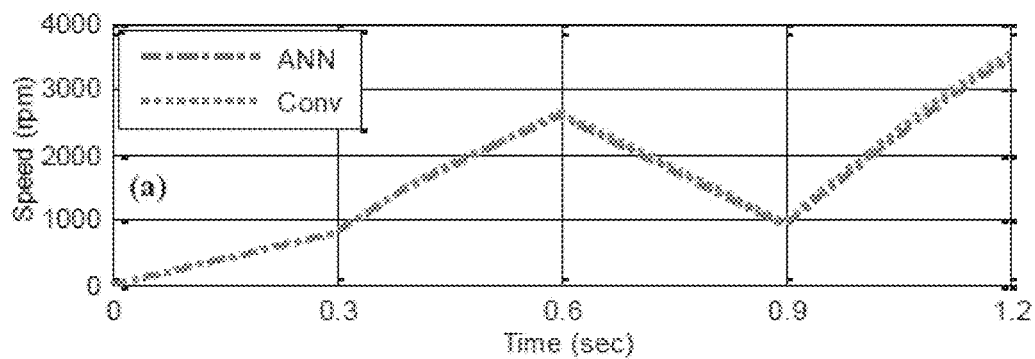
FIGS. 7A-7C illustrate current tracking at variable speed condition—conventional vs. ANN-ADP.
Figure 7B:
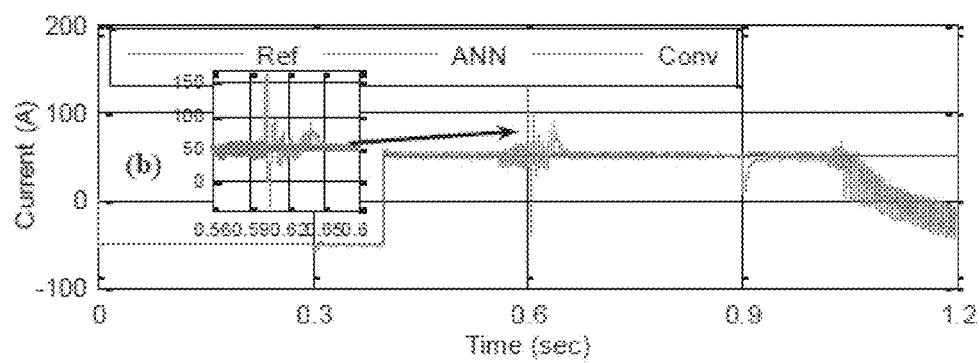
Figure 7C:
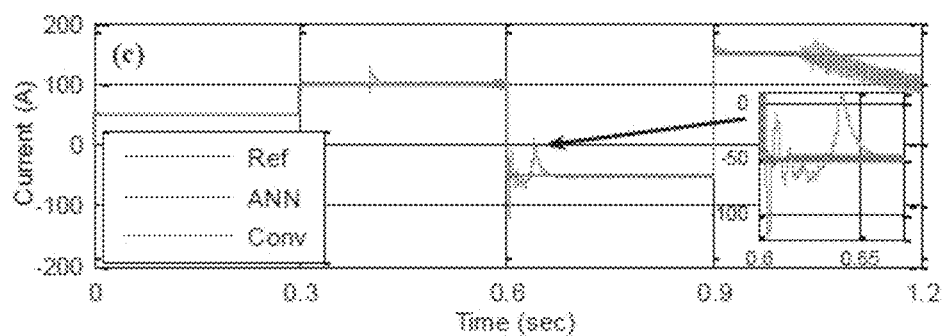

During the operation of a practical electric vehicle, vehicle speed changes all the time. Normally, based on the difference between actual and driver desired vehicle speeds, a torque command is generated, which is converted into an MTPA current vector for control of an IPM motor. To evaluate IPM performance under variable speed condition, the ANN-ADP and conventional controllers are compared in FIG. 7, in which the motor is started from the rest and the motor speed depends on the current control of the IPM motor. In the figure, the d-axis current reference of the motor is initially 0 A and changes to −100 A at 0.5 sec. The q-axis current reference is initially 50 A and then changes to 100 A, −50 A and 150 A at 0.3 sec, 0.6 sec, and 0.9 sec, respectively. Before 0.6 sec, the motor speed increases until it starts to enter overmodulation mode. For the ANN-ADP controller, the motor can go in and out the overmodulation mode smoothly around 0.6 sec. However, high oscillations appear using the conventional control technique. After 0.9 sec, the motor speed increases faster due to a higher q-axis current reference, which drives the motor to operate from over modulation modes 1 and 2 and then six-step modulation region around 1 sec. Again, using the ANN-ADP, the operation of the motor is much more stable and has lower oscillations than using the conventional control technique. It needs to specify that in the six-step modulation mode, tracking of the reference currents become impossible due to the PWM saturation constraints of the inverter.

C. Robustness Against Motor Parameter Changes

Figure 8A:
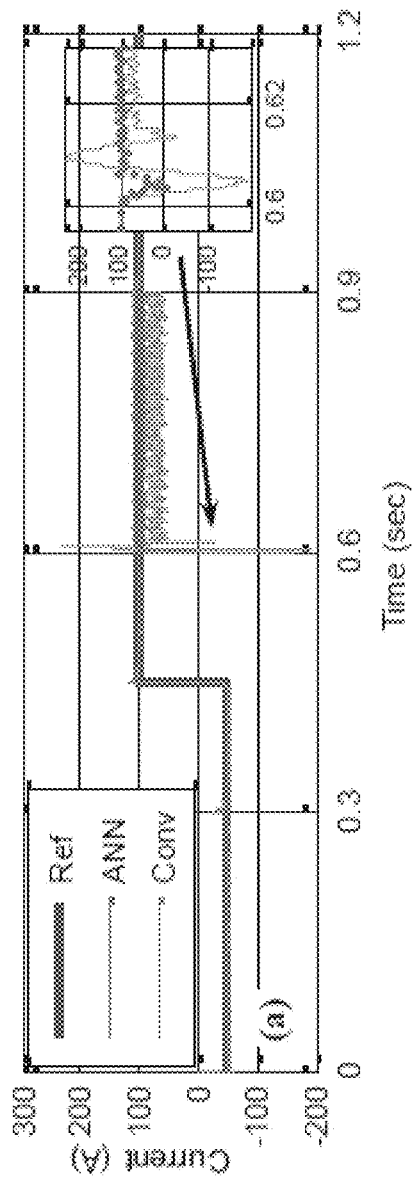
FIGS. 8A-8B illustrate current tracking under 50% increase of motor resistance/inductance (conventional vs. ANN-ADP)
Figure 8B:
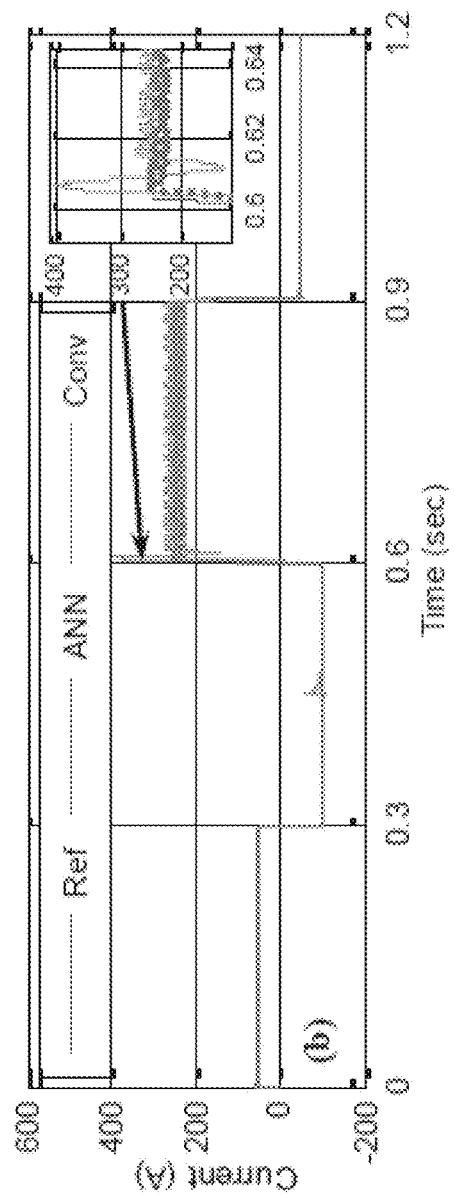

In practical applications, the resistance and inductance of the d- and q-axis loops may deviate from their nominal values by a significant amount. This will particularly affect the IPM motor current-loop controllers. A test for current tracking was carried out to evaluate conventional and ANN-ADP vector-control methods for cases that motor resistance and inductance increase and decrease by 50%, respectively, in which the motor speed is constant. FIG. 8 shows the reference and actual d- and q-axis motor currents by using the conventional and ANN-ADP control methods when motor resistance and inductance are increased by 50%. In the figure, the d-axis current reference of the motor is initially −50 A and changes to 100 A at 0.45 sec. The q-axis current reference is initially 50 A and then changes to −100 A, 250 A and −50 A at 0.3 sec, 0.6 sec, and 0.9 sec, respectively. As shown in FIG. 8, under the new resistance and inductance conditions, the ANN-ADP controller is more stable and reliable than the conventional one, especially when the motor operates in over modulation regions between 0.6 sec and 0.9 sec.

D. Impact of Flux Linkage of Rotor Magnet

Figure 9A:
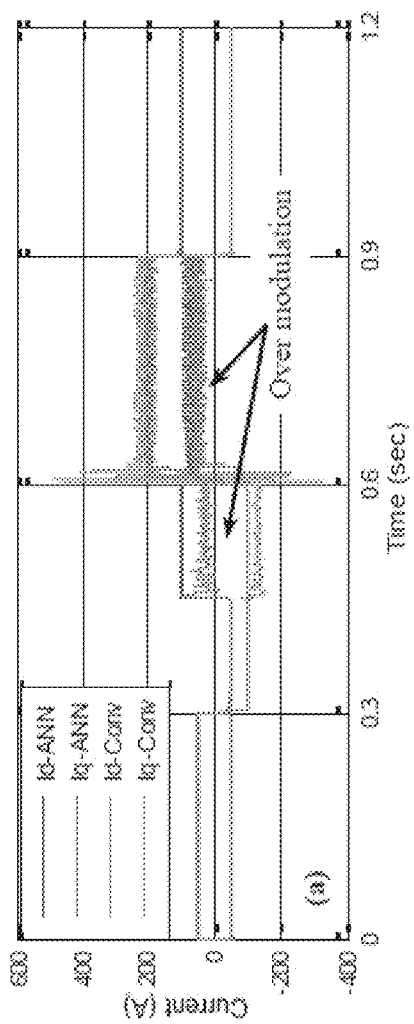
FIGS. 9A-9B illustrate conventional vs. ADP.
Figure 9B:
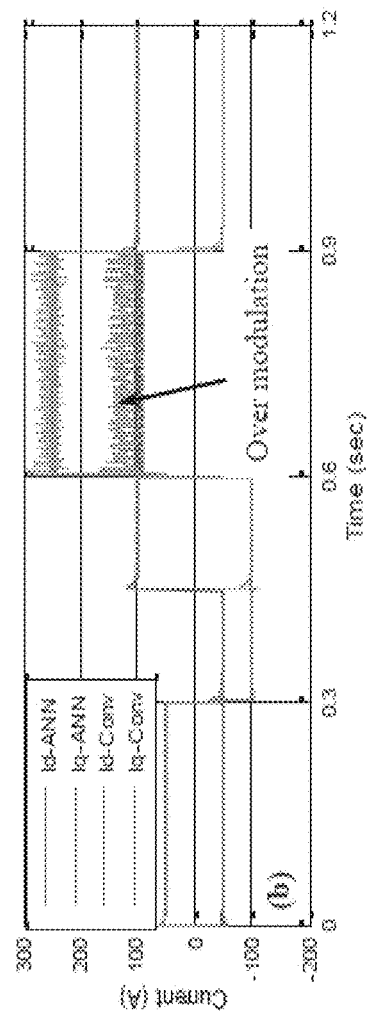

In an IPM motor, the rotor magnet flux linkage may change due to the increase or decrease of motor temperature. This would affect the performance of the motor. A test was carried out to evaluate conventional and ANN-ADP vector-control methods, when the rotor magnet flux linkage is lower or higher than the nominal value listed in Table I. FIG. 9 compares current tracking using conventional and ANN-ADP control methods, when the rotor magnet flux linkage increases and decreases by 40%, while other conditions are the same as those used in FIG. 9. In general, when the rotor magnet flux linkage is higher than the nominal value, it is more likely for the IPM to operate in over modulation regions (FIG. 9A); when the rotor magnet flux linkage is lower than the nominal value, it is less likely for the IPM to operate in over modulation regions (FIG. 9B). For either case, the study shows that a good dynamic response of d- and q-axis current tracking using the ANN-ADP controller. However, the conventional controller is more sensitive to fall into over or six-step modulation mode and more oscillations appear.

Hardware Experiment

A. Experimental Setup

Figure 10A:
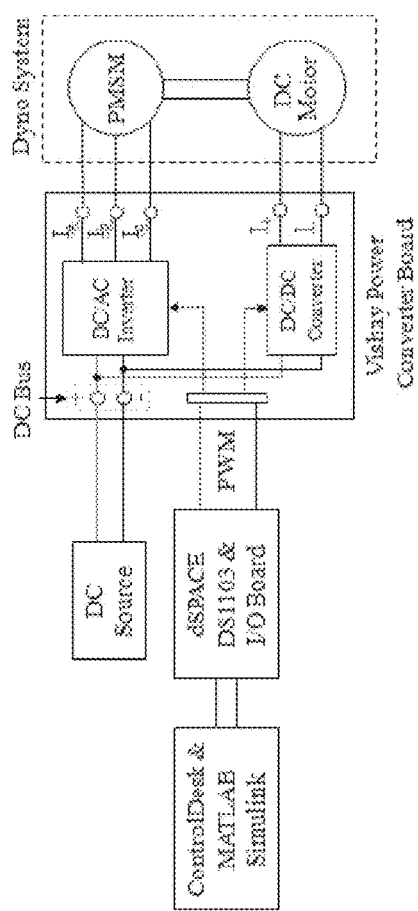
FIGS. 10A-10B illustrate hardware laboratory testing and control systems where
Figure 10B:
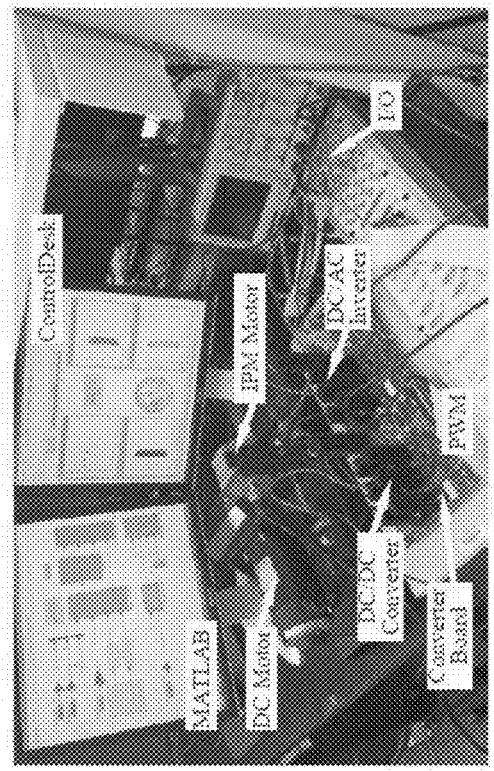

To further verify the feasibility and stability of the novel ANN-ADP vector controller, a DSP-based laboratory dyno system is built, as illustrated in FIG. 10. The experimental setup (FIG. 10(A)) consists of three major parts: (i) a motor drive system containing an IPM motor from Motorsolver coupled to a DC motor (DCGEN7135), (ii) a power converter board from Vishay HiRel Systems which has two independent three-leg converters, and (iii) a dSPACE DS1103 controller board to collect various input signals, such as current, voltage, and motor speed, and to generate PWM output for controlling the IPM and DC motors. The DC motor is controlled to keep the speed of the coupled DC and IPM system constant all the time while the IPM current controller is evaluated for its performance in tracking various d- and q-axis current commands. One of the two three-leg converters is formed as a DC/AC converter to control the IPM motor, while the other is formed as an H-bridge DC/DC converter to control the DC motor.

B. Experiment Evaluation

Figure 11A:
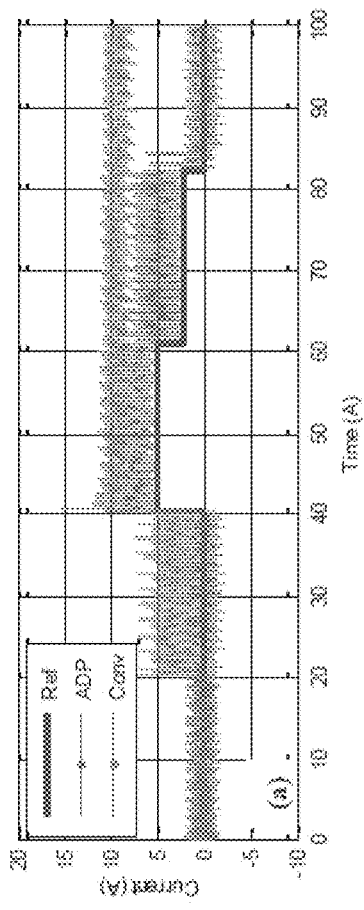
FIGS. 11A-11C illustrate ADP vs. conventional—hardware experiment of laboratory IPM motor.
Figure 11B:
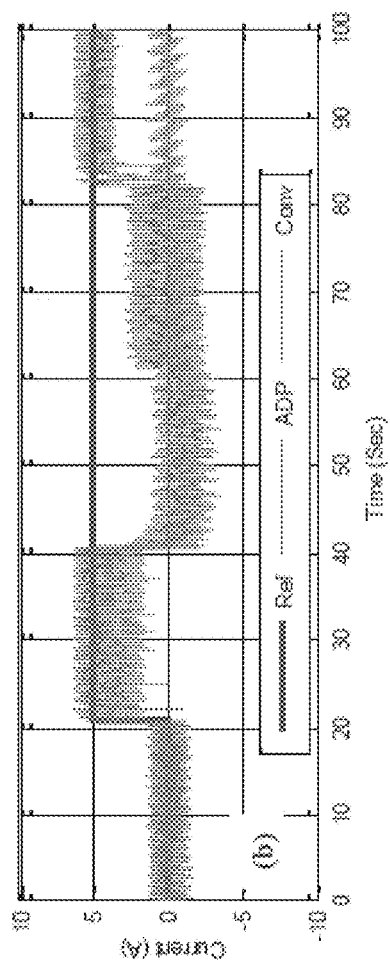
Figure 11C:
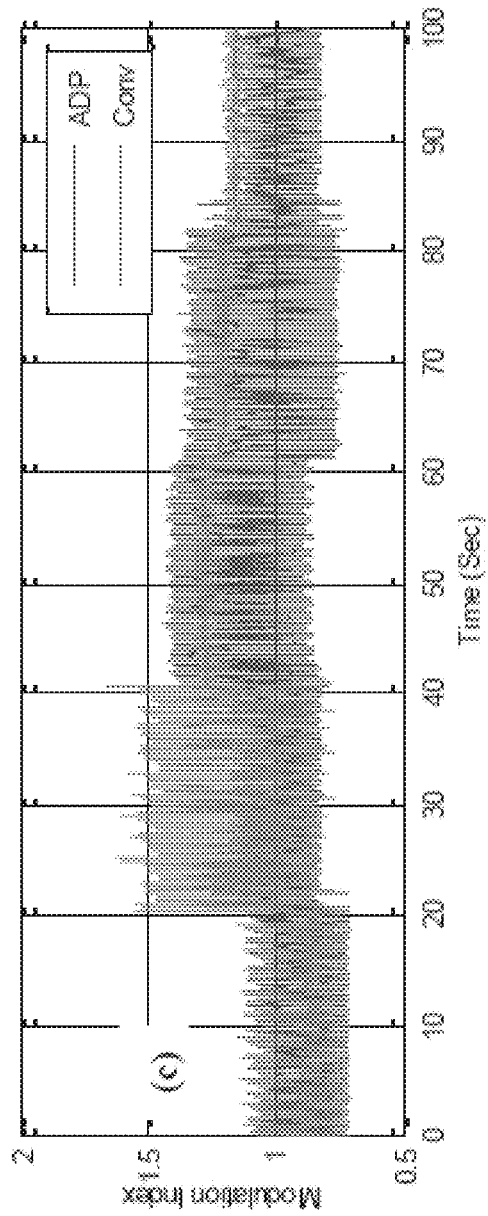

The test sequence is scheduled as follows, with t=0 sec as the starting point for data recording. Initially, d- and q-axis reference currents are zero and both conventional and ANN-ADP controllers are able to track the reference currents. At t=20 sec, the q-axis reference current changes to 5 A while the d-axis reference current remains unchanged. As shown in FIG. 11, there is a clear difference between the conventional and ANN-ADP control mechanisms. The conventional controller is unable to track the d- and q-axis reference currents while the ANN-ADP controller can still track the reference currents effectively although the modulation index generated by both controllers are beyond the linear modulation regions (FIG. 11C), demonstrating strong ability of the ANN-ADP controller in tracking the reference currents in over modulation regions. At t=40 sec, the d-axis reference current changes to 5 A while the q-axis reference current remains unchanged, causing the ac/dc inverter operating mainly in the six-step modulation mode. Hence, both the ANN-ADP and conventional controllers are unable to track the reference current. The d-axis current drops to 2A at about t=61 sec and 0 A at about t=82 sec, respectively. It is expected that the IPM motor should shift from the six-step modulation mode to over and then linear modulation mode. However, the conventional control mechanism is unable to regulate the IMP motor into the linear modulation mode while the ANN-based ADP controller successfully shifts IPM operation from the six-step modulation mode to over-modulation mode and later linear modulation mode. Overall, the hardware experiment demonstrates the great advantages of the proposed ANN-ADP control mechanism in operating the IPM motor reliably and efficiently in linear, over and six step modulation modes as well as in transition mode between linear and over modulation regions.

CONCLUSIONS

IPM motors are widely used in electric drive applications, particularly in electric drive vehicles. Described herein are ADP techniques based on artificial neural networks for vector control of IPM motors operating in linear and over modulation modes. Also described herein is how to implement the ADP vector control through artificial neural networks that are trained by using a modified LM+FATT algorithm, and how to integrate ANN-based ADP controller with a feedforward control element to operate IPM motors in linear and over modulation regions efficiently and reliably.

The performance evaluation demonstrates that by using ANN-based ADP, the current controller can track the reference d- and q-axis currents effectively in linear modulation regions; while in over modulation regions, the controller tries to track the reference currents as much as possible. Using the ANN-based ADP control, it is reliable to shift the IPM operation smoothly from six-step modulation to over modulation regions I and II as well as linear modulation region. However, with the same control structure using the conventional control, the proper and reliable operation of the IPM can be affected. Compared to conventional standard vector-control methods, the ANN-ADP vector control approach produces the faster response speed, lower overshoot, and, in general, more efficient and reliable performance for IPM operation in both linear and over modulation regions. Additionally, since the neural networks are trained under variable system parameters to implement the ADP, the ADP vector controller shows enhanced performance when the system parameters are difficult to identify. The success of the hardware experiments makes it possible to implement the ANN-based ADP controller under different modulation conditions in real-life IPM motors.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for controlling an induction motor. In one exemplary aspect, the units can comprise a control system that comprises one or more computing devices that comprise a processor 1221 as illustrated in FIG. 16 and described below. As used herein, processor refers to a physical hardware device that executes encoded instructions for performing functions on inputs and creating outputs.

FIG. 12 illustrates an exemplary computer that can be used for controlling an induction motor. As used herein, "computer" may include a plurality of computers. The computers may include one or more hardware components such as, for example, a processor 1221, a random access memory (RAM) module 1222, a read-only memory (ROM) module 1223, a storage 1224, a database 1225, one or more input/output (I/O) devices 1226, and an interface 1227. Alternatively, and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 1224 may include a software partition associated with one or more other hardware components. It is understood that the components listed above are exemplary only and not intended to be limiting.

Processor 1221 may include one or more processors, each configured to execute instructions and process data to perform one or more functions associated with a computer for controlling an induction motor. Processor 1221 may be communicatively coupled to RAM 1222, ROM 1223, storage 1224, database 1225, I/O devices 1226, and interface 1227. Processor 1221 may be configured to execute sequences of computer program instructions to perform various processes. The computer program instructions may be loaded into RAM 1222 for execution by processor 1221.

RAM 1222 and ROM 1223 may each include one or more devices for storing information associated with operation of processor 1221. For example, ROM 1223 may include a memory device configured to access and store information associated with the computer, including information for identifying, initializing, and monitoring the operation of one or more components and subsystems. RAM 1222 may include a memory device for storing data associated with one or more operations of processor 1221. For example, ROM 1223 may load instructions into RAM 1222 for execution by processor 1221.

Storage 1224 may include any type of mass storage device configured to store information that processor 1221 may need to perform processes consistent with the disclosed embodiments. For example, storage 1224 may include one or more magnetic and/or optical disk devices, such as hard drives, CD-ROMs, DVD-ROMs, or any other type of mass media device.

Database 1225 may include one or more software and/or hardware components that cooperate to store, organize, sort, filter, and/or arrange data used by the computer and/or processor 1221. For example, database 1225 may store data related to the control of an induction motor. The database may also contain data and instructions associated with computer-executable instructions for controlling an induction motor. It is contemplated that database 1225 may store additional and/or different information than that listed above.

I/O devices 1226 may include one or more components configured to communicate information with a user associated with computer. For example, I/O devices may include a console with an integrated keyboard and mouse to allow a user to maintain a database of digital images, results of the analysis of the digital images, metrics, and the like. I/O devices 1226 may also include a display including a graphical user interface (GUI) for outputting information on a monitor. I/O devices 1226 may also include peripheral devices such as, for example, a printer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1227 may include one or more components configured to transmit and receive data via a communication network, such as the Internet, a local area network, a workstation peer-to-peer network, a direct link network, a wireless network, or any other suitable communication platform. For example, interface 1227 may include one or more modulators, demodulators, multiplexers, demultiplexers, network communication devices, wireless devices, antennas, modems, and any other type of device configured to enable data communication via a communication network.

The figures illustrate the architecture, functionality, and operation of possible implementations of systems, methods and computer program products according to various implementations of the present invention. In this regard, each block of a flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Any combination of one or more computer readable medium(s) may be used to implement the systems and methods described hereinabove. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced, including the references sited below. The disclosures of these publications in their entireties are hereby incorporated by reference into this application in order to more fully describe the state of the art to which the methods and systems pertain and to illustrate improvements over the present state of the art in claimed invention.

The foregoing description, for purposes of explanation, used specific nomenclature to provide a thorough understanding of the described embodiments. However, it will be apparent to one skilled in the art that the specific details are not required in order to practice the described embodiments.

Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

REFERENCES

[1] Pellegrino, G., Vagati, A., Guglielmi, P., and Boazzo, B., "Performance comparison between surface-mounted and interior PM motor drives for electric vehicle application," IEEE Trans. Ind. Electron., 59(2), 803-811, 2012.

[2] M. A. Rahman, and M. A. Masrur. "Advances on IPM technology for hybrid electric vehicles." 2009 IEEE Vehicle Power and Propulsion Conference, 2009.

[3] K. Zhou and D. Wang, "Relationship between space-vector modulation and three-phase carrier-based PWM: a comprehensive analysis," IEEE Trans. Ind. Electron., 49(1), (2002): 186-196.

[4] D. Lee and G. Lee, "A novel overmodulation technique for space-vector PWM inverters," IEEE Trans. Power Electron., 13(6), (1998): 1144-1151.

[5] B. Akin and M. Bhardwaj, "Sensorless Field Oriented Control of 3-Phase Permanent Magnet Synchronous Motors," Texas Instruments Incorporated. Available at http://www.ti.com/lit/an/sprab3/sprab3.pdf.

[6] R. Filka and M. Stulrajter, "3-Phase PMSM Motor Control Kit with the MPC5604P," Freescale Semiconductor, Inc., available at https://cache.freescale.com/files/product/doc/AN 1931.pdf.

[7] S. Li, T. A. Haskew, and L. Xu, "Conventional and Novel Control Designs for Direct Driven PMSG Wind Turbines," Electric Power Syst. Research, vol. 80, pp. 328-338, March 2010.

[8] T. Lee, C. Lin, and F. Lin, "An adaptive Hoo controller design for permanent magnet synchronous motor drives," Control Engineering Practice, vol. 13, pp. 425-439, April 2004

[9] M. Uddin and J. Khastoo, "Fuzzy Logic-Based Efficiency Optimization and High Dynamic Performance of IPMSM Drive System in Both Transient and Steady-State Conditions," IEEE Trans. Ind. Appl., vol. 50(6), pp. 4251-4259, November/December 2014.

[10] C. Xia, J. Zhao, Y. Yan, and T. Shi, "A Novel Direct Torque and Flux Control Method of Matrix Converter-Fed PMSM Drives," IEEE. Trans. Power Electron., vol. 29(10), pp. 5417-5430, October 2014.

[11] C. Xia, B. Ji, and Y. Yan, "Smooth Speed Control for Low-Speed High-Torque Permanent-Magnet Synchronous Motor Using Proportional-Integral-Resonant Controller," IEEE Trans. Ind. Electron., vol. 62(4), pp. 2123-2134, April 2015.

[12] Y. Fan, L. Zhang, M. Cheng, and K. Chau, "Sensorless SVPWM-FADTC of a New Flux-Modulated Permanent Magnet Wheel Motor Based on a Wide-Speed Sliding Mode Observer," IEEE. Trans. Ind. Electron., vol. 62(5), pp. 3143-3151, May 2015.

[13] C. Lin, T. Liu, J. Yu, L. Fu, and C. Hsiao, "Model-Free Predictive Current Control for IPMSM Drives Based on Current Difference Detection Techniques," IEEE Trans. Ind. Electron., vol. 61(2), pp. 667-681, February 2014.

[14] D. Flieller, N. Nguyen, P. Wira, G. Sturtzer, D. Abdeslam, and J. Merckle, "A Self-Learning Solution for Torque Ripple Reduction for Nonsinusoidal Permanent Magnet Motor Drives Based on Artificial Neural Networks," IEEE Trans. Ind. Electron., vol. 61(2), pp. 655-666, February 2014.

[15] R. B. Bellman, Dynamic Programming, Princeton, N.J., USA: Princeton University Press, 1957.

[16] F. Wang, H. Zhang, and D. Liu, "Adaptive dynamic programming: An introduction," IEEE Comput. Intell. Mag., vol. 4(2), pp. 39-47, May 2009.

[17] D. Prokhorov and D. Wunsch, "Adaptive Critic designs," IEEE Trans. Neural Netw., vol. 8(5), pp. 997-1007, September 1997.

[18] Y. Jiang and Z. Jiang, "Robust Adaptive Dynamic Programming and Feedback Stabilization of Nonlinear Systems," IEEE Trans. Neural Netw. Learn. Syst., vol. 25(5), pp. 882-893, May 2014.

[19] G. G. Lendaris, L. Schultz, and T. T. Shannon, "Adaptive Critic Design for Intelligent Steering and Speed Control of a 2-Axle Vehicle," Proc. The 2000 Int. Joint Conf. on Neural Netw., Como, Italy, July 2000.

[20] D. Han, and S. N. Balakrishnan, "Adaptive Critic Based Neural Networks for Control-Constrained Agile Missile Control," Proc. The American Control Conf., San Diego, USA, June 2-4, pp. 2600-2604, 1999.

[21] G. Saini, and S. N. Balakrishnan, "Adaptive Critic Based Neurocontroller for Autolanding of Aircraft," Proc. The American Control Conf., Albuquerque, USA, June 4-6, pp. 1081-1085, 1997.

[22] S. N. Balakrishnan and V. Biega, "Adaptive-Critic-Based Neural Networks for Aircraft Optimal Control," J. Guidance, Control, and Dynamics, vol. 19, no. 4, pp. 893-898, 1996.

[23] K. KrishnaKumar and J. Neidhoefer, "Immunized Adaptive Critics for Level-2 Intelligent Control," Proc. The IEEE Int. Conf. on Systems, Man and Cybernetics, Orlando, USA, pp. 856-861, Oct. 12-15, 1997.

[24] G. K. Venayagamoorthy, R. G. Harley and D. C. Wunsch, "Comparison of Heuristic Dynamic Programming and Dual Heuristic Programming Adaptive Critics for Neurocontrol of a Turbogenerator," IEEE Trans. on Neural Netw., vol. 13, no. 3, pp. 764-773, 2002.

[25] H. Zhang, R. Song, Q. Wei, and T. Zhang, "Optimal Tracking Control for a Class of Nonlinear Discrete-Time Systems with Time Delays Based on Heuristic Dynamic Programming," IEEE Trans. on Neural Netw., vol. 22, no. 12, pp. 1851-1862, 2011.

[26] N. Mohan, Advanced Electric Drives—Analysis, Modeling and Control using Simulink, MN: Minnesota Power Electronics Research & Education, ISBN 0-9715292-0-5, 2001.

[27] A. Consoli, G. Scarcella, G. Scelba, & A.Testa, "Steady-state and transient operation of IPMSMs under maximum-torque-per-ampere control," IEEE Trans. Ind. Appl., 46(1), 121-129, 2010.

[28] M. K. Modi, S. Venugopal, and G. Narayanan, "Space vector-based analysis of overmodulation in triangle-comparison based PWM for voltage source inverter," Sadhana, 38(3), 331-358, 2013.

[29] N. Mohan, T. M. Undeland, and W. P. Robbins, Power Electronics: Converters, Applications, and Design, 3rd Ed., John Wiley & Sons Inc., October 2002.

[30] M. Hagan and M. Menhaj, "Training feedforward networks with the Marquardt algorithm," IEEE Trans. Neural Netw., vol. 5(6), pp. 989-993, November 1994.

[31] X. Fu, S. Li, M. Fairbank, D. C. Wunsch, and E. Alonso, "Training recurrent neural networks with the Levenberg-Marquardt algorithm for optimal control of a grid connected converter," IEEE Trans. Neural Netw. Learn. Syst., October 2014.

[32] O. Tremblay and L. A. Dessaint, "Hybrid Electric Vehicle (HEV) Power Train Using Battery Model," MATLAB 2010, The MathWorks, Inc.

[33] B. Jeanneret, R. Trigui, F. Badin, and F. Harel, "New Hybrid Concept Simulation tools, evaluation on the Toyota Prius Car," EVS' 16, Beijing (China), October 1999.

[34] MotorSolver, "(4) Pole IPM Type PM-AC Synchronous motor used for University Teaching Lab Dyno-Kits (Similar to Toyota Prius Traction Motor)," available at http://motorsolver.com/wp/wp-content/uploads/2015/03/9-PRIUS-4POLE-IPM-SPEC S-small.pdf.

What is claimed:

1. A method for controlling an interior-mounted permanent magnet (IPM) alternating-current (AC) electrical machine by:
providing a pulse-width modulated (PWM) converter operably connected between an electrical power source and the IPM AC electrical machine;
providing a neural network vector control system operably connected to the PWM converter, the neural network vector control system comprising a current-loop neural network configured to implement an approximate dynamic programming (ADP) algorithm, wherein the current-loop neural network is trained to minimize a cost function of the ADP algorithm using a forward accumulation through time ("FATT") algorithm;
receiving a plurality of inputs at the current-loop neural network;
outputting a first compensating dq-control voltage from the current-loop neural network, wherein the current-loop neural network is configured to optimize the first compensating dq-control voltage based on the plurality of inputs;
providing a feedforward controller operably connected to the PWM converter;
receiving reference current inputs at the feedforward controller, wherein the inputs at the feedforward controller comprise a reference d-axis current, isd*, and a reference q-axis current, isq*;
outputting a second compensating dq-control voltage from the feedforward controller, wherein the feedforward controller is configured to regulate the second compensating dq-control voltage based on the reference current inputs; and
controlling the PWM converter using the first compensating dq-control voltage and the second compensating dq-control voltage,
wherein the feedforward controller is designed based on default parameters of the IPM AC electrical machine.

2. The method of claim 1, wherein the compensating dq-control voltages from the current-loop neural network and feedforward controller are further added together to form a resultant compensating dq-control voltage; and
controlling the PWM converter using the resultant compensating dq-control voltage.

3. The method of claim 2, wherein the resultant compensating dq-control voltage is normalized based on the maximum possible dq control voltage under six-step modulation condition of the PWM converter; and
controlling the PWM converter using the normalized resultant compensating dq-control voltage.

4. The method of claim 3, wherein the normalized resultant compensating dq-control voltage is further processed through a saturation function;
    limiting the amplitude of the normalized dq-control voltage to 1 or less, which is the six-step modulation index; and
    controlling the PWM converter using the processed compensating dq-control voltage.

5. The method of claim 4, wherein the normalized resultant compensating dq-control voltage is allowed to be larger than 1, which is the six-step modulation index, for controlling the IPM AC electrical machine in over modulation and six-step modulation regions.

6. The method of claim 5, wherein the processing through the saturation function captures transient information in terms of amplitude and angle of the normalized resultant compensating dq-control voltage for controlling the IPM AC electrical machine in over modulation and six-step modulation regions.

7. The method of claim 4, wherein the normalized resultant compensating dq-control voltage is allowed to change rapidly from smaller than 1 to larger than 1 before the saturation process; and
    providing control capability when the IPM AC electrical machine is operating between over modulation and six-step modulation regions.

8. The method of claim 1, wherein changes to the plurality of inputs to the current-loop neural network are blocked when the IPM AC electrical machine completely operates in a six-step modulation region; and
    controlling the IPM AC electrical machine to operate on a boundary of the six-step modulation region.

9. The method of claim 8, wherein the blocking applied to the plurality of inputs to the current-loop neural network is released when the operation of an IPM machine returns from the six-step modulation region to an over modulation region or a linear modulation region; and
    recovering the current-loop neural network to its full control capability.

10. A system for controlling an interior-mounted permanent magnet (IPM) alternating-current (AC) electrical machine comprising:
    a pulse-width modulated (PWM) converter operably connected between an electrical power source and the IPM AC electrical machine;
    a neural network vector control system operably connected to the PWM converter, the neural network vector control system comprising a processor and a current-loop neural network configured to implement an approximate dynamic programming (ADP) algorithm, wherein the current-loop neural network is trained to minimize a cost function of the ADP algorithm using a forward accumulation through time ("FATT") algorithm, said neural network vector control system configured to:
        receive a plurality of inputs at the current-loop neural network; and
        output a first compensating dq-control voltage from the current-loop neural network, wherein the current-loop neural network is configured to optimize the first compensating dq-control voltage based on the plurality of inputs; and
    a feedforward controller operably connected to the PWM converter, wherein the feedforward controller:
        receives reference current inputs, wherein the inputs at the feedforward controller comprise a reference d-axis current, $i_{sd}*$, and a reference q-axis current, $i_{sq}*$;
        outputs a second compensating dq-control voltage from the feedforward controller, wherein the feedforward controller regulates the second compensating dq-control voltage based on the reference current inputs; and
        controls the PWM converter using the first compensating dq-control voltage and the second compensating dq-control voltage.

11. The system of claim 10, wherein the compensating dq-control voltages from the current-loop neural network and the feedforward controller are further added together to form a resultant compensating dq-control voltage; and
    the PWM converter is controlled using the resultant compensating dq-control voltage.

12. The system of claim 11, wherein the resultant compensating dq-control voltage is normalized based on the maximum possible dq control voltage under six-step modulation condition of the PWM converter; and
    the PWM converter is controlled using the normalized resultant compensating dq-control voltage.

13. The system of claim 12, wherein the normalized resultant compensating dq-control voltage is further processed through a saturation function;
    the amplitude of the normalized dq-control voltage is limited to 1 or less, which is the six-step modulation index; and
    the PWM converter is controlled using the processed compensating dq-control voltage.

14. The system of claim 13, wherein the normalized resultant compensating dq-control voltage is allowed to be larger than 1, which is the six-step modulation index, for controlling the IPM AC electrical machine in over modulation and six-step modulation regions.

15. The system of claim 14, wherein the processing through the saturation function captures transient information in terms of amplitude and angle of the normalized resultant compensating dq-control voltage for controlling the IPM AC electrical machine in over modulation and six-step modulation regions.

16. The system of claim 13, wherein the normalized resultant compensating dq-control voltage is allowed to change rapidly from smaller than 1 to larger than 1 before the saturation process; and
    control capability is provided when the IPM AC electrical machine is operating between over modulation and six-step modulation regions.

17. The system of claim 10, wherein changes to the plurality of inputs to the current-loop neural network are blocked when the IPM AC electrical machine completely operates in a six-step modulation region; and
    the IPM AC electrical machine is controlled to operate on a boundary of the six-step modulation region.

18. The system of claim 17, wherein the blocking applied to the plurality of inputs to the current-loop neural network is released when the operation of an IPM machine returns from the six-step modulation region to an over modulation region or a linear modulation region; and the current-loop neural network is recovered to its full control capability.

* * * * *